United States Patent
Thakkar et al.

(10) Patent No.: US 10,382,532 B2
(45) Date of Patent: *Aug. 13, 2019

(54) CROSS-CLOUD OBJECT MAPPING FOR HYBRID CLOUDS

(71) Applicant: VMware, Inc., Palo Alto, CA (US)

(72) Inventors: Sachin Thakkar, San Jose, CA (US);
Debashis Basak, San Jose, CA (US);
Serge Maskalik, Los Gatos, CA (US);
Mark Bryan Whipple, Golden, CO (US); Aarti Kumar Gupta, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/666,513

(22) Filed: Aug. 1, 2017

(65) Prior Publication Data

US 2017/0359410 A1 Dec. 14, 2017

Related U.S. Application Data

(63) Continuation of application No. 14/529,469, filed on Oct. 31, 2014, now Pat. No. 9,723,065.
(Continued)

(51) Int. Cl.
*G06F 9/455* (2018.01)
*H04L 29/08* (2006.01)
(Continued)

(52) U.S. Cl.
CPC .......... *H04L 67/10* (2013.01); *G06F 9/45558* (2013.01); *G06F 9/5072* (2013.01);
(Continued)

(58) Field of Classification Search
CPC ......... G06F 9/45558; G06F 2009/4557; G06F 2009/45595; G06F 9/5077; G06F 9/5072;
(Continued)

(56) References Cited

U.S. PATENT DOCUMENTS

2009/0300607 A1* 12/2009 Ferris .................. G06F 9/45558
718/1
2013/0283364 A1* 10/2013 Chang .................... H04L 49/70
726/12

(Continued)

*Primary Examiner* — Chirag R Patel
*Assistant Examiner* — Marshall M McLeod
(74) *Attorney, Agent, or Firm* — Loza & Loza, LLP (57) ABSTRACT

A method for managing an application executing in a computing system is disclosed as including a private cloud operated by a first organization and a multi-tenant public cloud of which the first organization is one of the tenants. The method comprises instantiating a first virtual object in the private cloud and instantiating a second virtual object in the public cloud for executing the application cooperatively with the first virtual object. Mapping associated with the first virtual object is generated, wherein the mapping comprises a first identifier having a context of the private cloud and a second identifier having a context of the public cloud. The method further includes detecting migration of the first or second virtual object such that both of the first and second virtual objects are instantiated in a single one of the private and public clouds and updating the mapping to reflect the migration.

12 Claims, 3 Drawing Sheets

Related U.S. Application Data

(60) Provisional application No. 62/063,273, filed on Oct. 13, 2014.

(51) Int. Cl.
*H04L 12/46* (2006.01)
*H04L 12/26* (2006.01)
*G06F 9/50* (2006.01)

(52) U.S. Cl.
CPC .......... *H04L 12/4641* (2013.01); *H04L 43/10* (2013.01); *H04L 67/34* (2013.01); *G06F 2009/4557* (2013.01)

(58) Field of Classification Search
CPC .. G06F 9/4856; G06F 9/45533; G06F 11/203; G06F 9/5088; G06F 11/1469; G06F 3/0647; H04L 67/10; H04L 12/4641; H04L 43/10; H04L 67/34
USPC ................................ 709/204, 217, 223, 226
See application file for complete search history.

(56) References Cited

U.S. PATENT DOCUMENTS

| | | | |
|---|---|---|---|
| 2014/0334495 A1 | 11/2014 | Stubberfield et al. | |
| 2015/0172331 A1* | 6/2015 | Raman .................. | H04L 65/403 709/204 |

* cited by examiner

CROSS-CLOUD OBJECT MAPPING FOR HYBRID CLOUDS

CROSS-REFERENCE TO RELATED APPLICATIONS

This application is a continuation of U.S. patent application Ser. No. 14/529,469 entitled "Cross-Cloud Object Mapping for Hybrid Clouds," which was filed on Oct. 31, 2014 and issued Aug. 1, 2017 as U.S. Pat. No. 9,723,065, and which claims priority to U.S. Provisional Patent Application No. 62/063,273, filed Oct. 13, 2014, the entire contents of which are incorporated by reference herein.

BACKGROUND

Cloud architectures are used in cloud computing and cloud storage systems for offering infrastructure-as-a-service (IaaS) cloud services. Examples of cloud architectures include the VMware vCloud™ Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

SUMMARY

A method for managing an application executing in a computing system is disclosed as including a first cloud and a second cloud, wherein the first cloud is a private cloud operated by a first organization and the second cloud is a multi-tenant public cloud of which the first organization is one of the tenants. The method comprises instantiating a first virtual object in the private cloud and instantiating a second virtual object in the public cloud for executing the application cooperatively with the first virtual object. Mapping associated with the first virtual object is generated, wherein the mapping comprises a first identifier having a context of the private cloud and a second identifier having a context of the public cloud. The method further includes detecting migration of the first or second virtual object such that both of the first and second virtual objects are instantiated in a single one of the private and public clouds and updating the mapping to reflect the migration.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
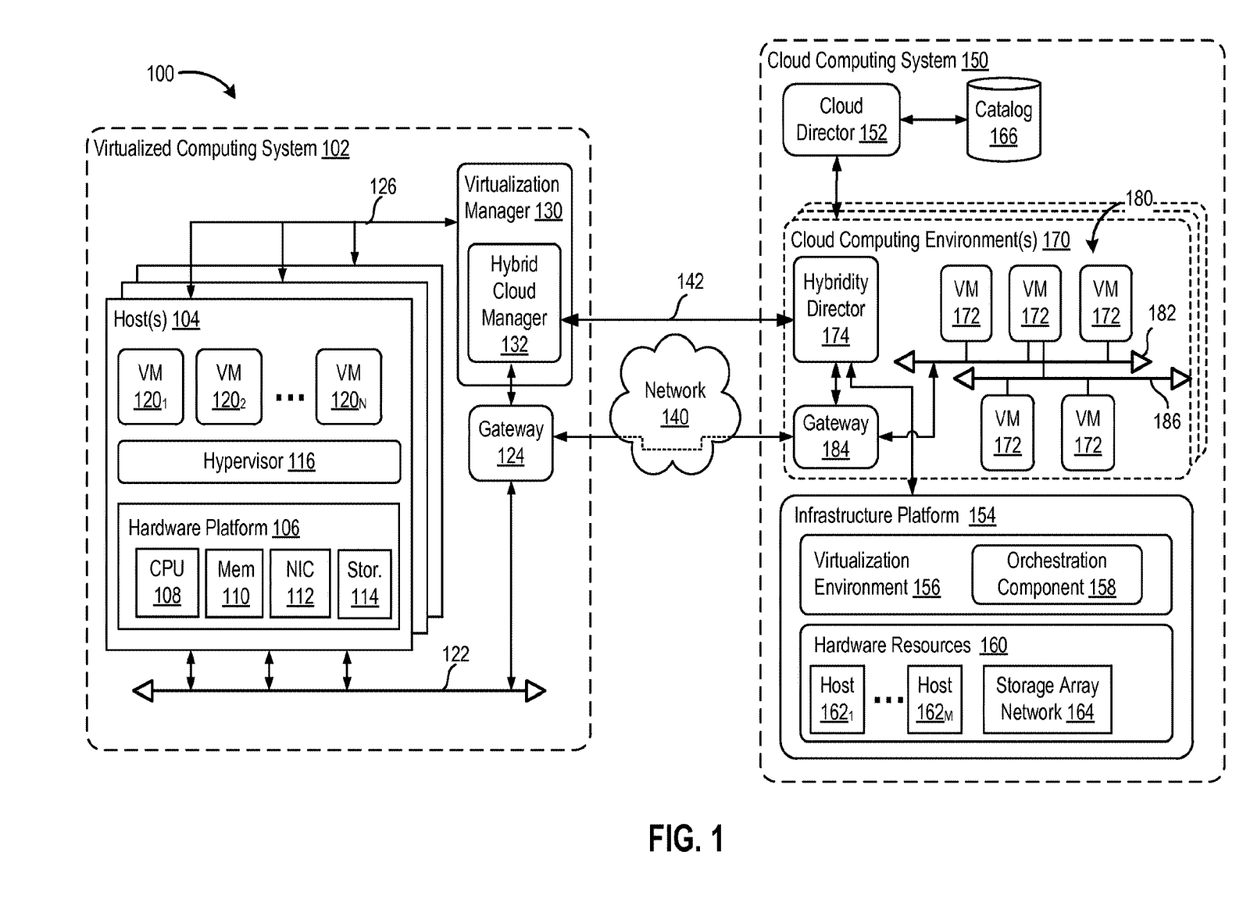
FIG. 1 is a block diagram that illustrates a computer system in which one or more embodiments may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described later in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_M$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Figure 2A:
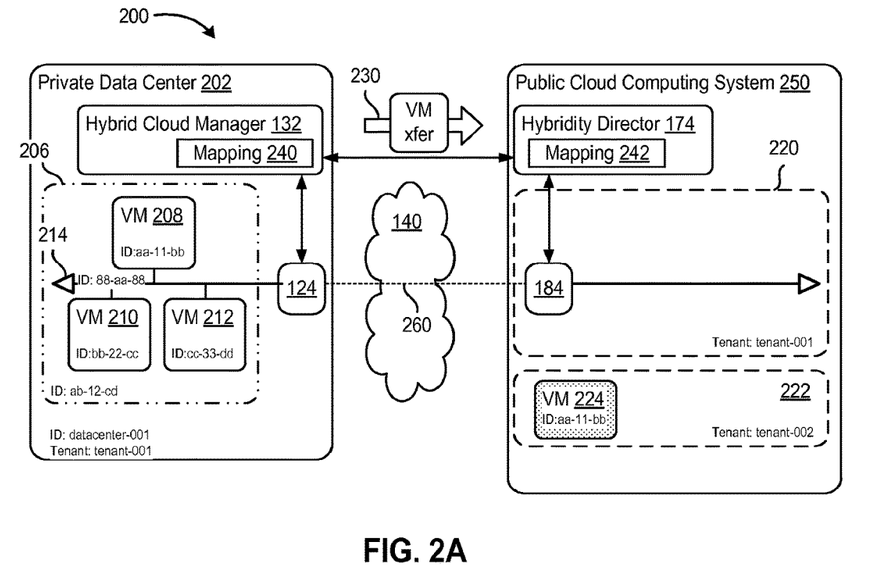
FIGS. 2A and 2B are block diagrams depicting cross-cloud deployment operations of a hybrid cloud computing system, according to one embodiment of the present disclosure.
Figure 2B:
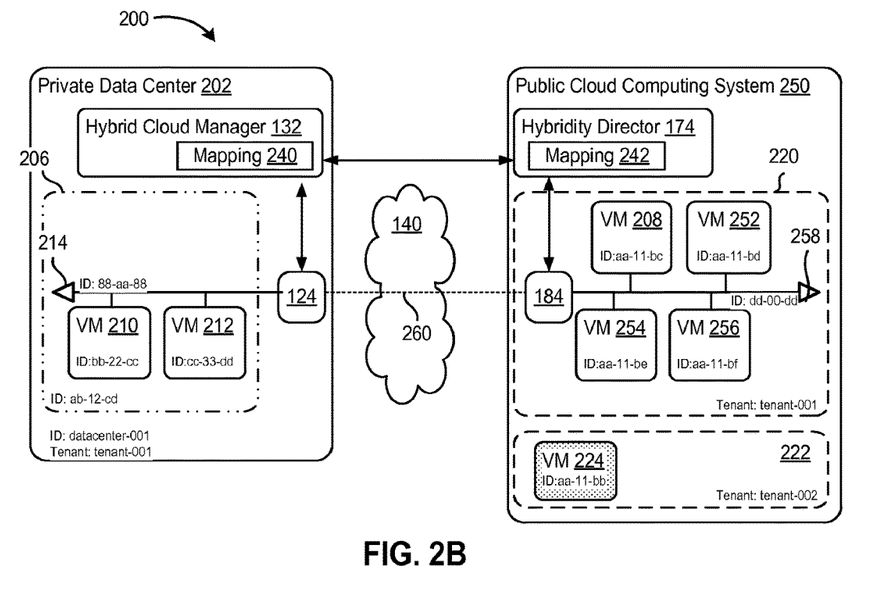

FIGS. 2A and 2B are block diagrams depicting cross-cloud deployment operations of a hybrid cloud computing system 200, according to one embodiment of the present disclosure. Hybrid cloud computing system 200 is configured to provide a common platform for executing virtual workloads seamlessly between a private data center 202, which may configured similar to virtualized computing system 102, and a public cloud computing system 250, which may be configured similar to cloud computing system 150 in FIG. 1. Private data center 202 may be managed by an enterprise (first organization), and the enterprise may be a tenant in public cloud computing system 250, which is managed by a cloud provider (second organization). For example, a virtual data center 220 within public cloud computing system 250 may be allocated to the enterprise as one tenant, while other virtual data centers 222 having other VMs 224 associated other tenants may be allocated in public cloud computing system 250.

In the embodiment shown in FIG. 2A, an instance 206 of a packaged virtual machine application has been deployed and instantiated in private data center 202. Application instance 206 is comprised of a plurality of VMs 208, 210, and 212 interconnected by a virtual network 214. For sake of illustration purposes, the application instance 206 is a multi-tier application having a web tier implemented by VM 208 executing as a web server, an application tier implemented by VM 210 executing as an application server, and a database tier implemented by VM 212 executing as a database server. It should be recognized that other types of applications and virtual machine application packages may be used.

As part of the deployment of application instance 206, virtualization manager 130 assigns an object identifier to each of the "virtual objects" created, including an object identifier that refers to application instance 206 as a whole, but also individual object identifiers to each of VMs 208, 210, 212, and virtual network 214. Each assigned identifier may be unique within private data center 202. In other words, the identifier may be unique within a management domain comprised of the hosts and virtual computing resources overseen by virtualization manager 130. In the example shown in FIG. 2A, application instance 206 is assigned an object identifier "ab-12-cd", VMs 208, 210, 212 are assigned the object identifiers "aa-11-bb", "bb-22-cc", "cc-33-dd", respectively, and virtual network 214 is assigned the object identifier "88-aa-88." In some implementations, identifiers assigned to virtual objects may have a format made of an object type and an auto-incremented numeral. For example, the identifier for a VM may be "vm-092," where "vm" is the virtual machine object type and "092" is the counter. In other implementations, an identifier assigned to a virtual object may be a multi-bit value (e.g., 128-bit integer) derived from other metadata related to the virtual object, such as BIOS information from the physical host on which a VM is executing, or by hashing the path to a virtual machine configuration file. Similarly, cloud computing system 250 assigns object identifiers to virtual objects for tracking the virtual objects created and owned within the management domain overseen by infrastructure platform 154.

In one or more embodiments, private data center 202 may have its own identifier. That is, the management domain defined by private data center 202 may be assigned a unique identifier (e.g., "datacenter-001"). Private data center 202 may be associated with a tenant identifier (e.g., "tenant-001") specifying the organization managing the private data center, i.e., the enterprise.

During operation, hybrid cloud manager 132 (e.g., in response to user input) may deploy a portion, or all, of application instance 206 to virtual data center 220. In some embodiments, hybrid cloud manager 132 may transfer one or more existing virtual computing resources (e.g., VM 208) from private data center 202 to virtual data center 220 (the operation being depicted by arrow 230 in FIG. 2A). In other embodiments, hybrid cloud manager 132 may simply deploy additional virtual computing resources, such as VMs, virtual networks, and virtual storage, in virtual data center 220 for use by application instance 206. In some cases, this cross-cloud deployment may be performed to handle a surge in workload that requires additional virtual computing resources, or alternatively, may be performed as part of the initial deployment of application instance. In one scenario depicted in FIG. 2B, the web tier of a multi-tier application may be scaled out within virtual data center 220 in response to increased user traffic to the multi-tier application. As such, hybridity director 174 instantiates within virtual data center 220 a plurality of VMs 208, 252, 254, and 256, which are part of application instance 206, and a virtual network 258, which is a component of a stretched network combining with virtual network 214. As shown in FIG. 2B, VMs 208, 252, 254, 256 and virtual network 258 are assigned the object identifiers "aa-11-bc," "aa-11-bd," "aa-11-be," "aa-11-bf," and "dd-00-dd", respectively.

However, cloud computing system 250 typically assigns object identifiers to the instantiated virtual objects without any correlation to object identifiers assigned by private data center 202. That is, the object identifiers assigned to virtual objects within cloud computing system 250 are designed to be unique only within the management domain overseen by infrastructure platform 154. The same object identifiers assigned to a VM might not be usable when that VM is migrated from private data center 202 to cloud computing system 250, as the object identifier might have already been assigned to another virtual object within cloud computing system 250, including virtual objects allocated to other tenants. For example, as shown in FIG. 2B, the object identifier "aa-11-bb" associated with VM 208 on the private data center side has already been assigned to a VM 224 allocated to another tenant within cloud computing system 250, resulting in duplicate and conflicting identifiers. Instead, the migrated VM 208 is assigned a different object identifier "aa-11-bc." Furthermore, applications, virtual machines, or policies in private data center 202 may refer to specific object identifiers (assigned by private data center 202), but would otherwise be linked to an unrelated set of virtual objects if applied to cloud computing system 250. For example, an object identifier "1" on a tenant instance "A" may be represented by an identifier "app-54" as its local identifier connected with an e-mail server application policy, such as a Microsoft® Exchange® policy.

Accordingly, embodiments of the present disclosure provide a mechanism to re-contextualize a specific set of object identifiers from a private data center to the corresponding virtual data center in a public cloud computing system. In this way, an object identifier referring to a particular application instance may still refer to that application instance when being migrated from a private data center to the public cloud, and vice versa, from the public cloud back to the private data center.

In one or more embodiments, hybrid cloud manager 132 is configured to generate a mapping 240 associating virtual objects with a local object identifier contextualized by the virtual object's location. Similarly, hybridity director 174 on the cloud side may be configured to maintain a corresponding mapping 242. Hybrid cloud manager 132 may generate a mapping for virtual objects within private data center 202 that tracks the tenant and the particular data center, while the mapping for virtual objects within cloud computing system 250 may be tracked by a contextualization of the tenant and the object identifier (e.g., packaged application identifier) in public cloud computing system 250.

It is noted that the mapping for virtual objects may be created and maintained at private data center (e.g., by hybrid cloud manager 132), at public cloud computing system 250 (e.g., by hybridity director 174), or both. In one scheme, object identifiers for virtual objects and an audit trail is maintained on both cloud endpoints (i.e., both public cloud computing system 250 and private datacenter 202). Hybrid cloud manager may maintain the audit trail (e.g., by building a linked list in one implementation) that tracks the history of a specific virtual object with each cloud endpoint tracking itself and immediate predecessor. This allows embodiments to treat the context as a chain of cloud-id to cloud-id mappings along a lifecycle of a virtual object: i.e., create-migrate-migrate- . . . -migrate-delete. As such, each system within hybrid cloud preserves historic data of all the mappings of all virtual objects to allow this reconstruction. This may be also useful to track the historical location of a virtual object for auditing and compliance purposes.

In another scheme, embodiments of the present disclosure may contextualize the object identifiers associated with each virtual object and an audit trail as metadata that follows a virtual object. This enables application-specific data that should be kept in an up-to-date fashion alongside a specific virtual object. In some embodiments, a linked list of historical context where all items in the list are maintained alongside the virtual object via metadata managed by either hybrid cloud manager 132, hybridity director 174, or both.

In one embodiment, hybrid cloud manager 132 updates mapping 240 to track that a virtual object in the public cloud is a virtual computing resource (e.g., VM) corresponding to a virtual object that had been migrated from (i.e., prior deployed in) private data center 202. Using the example shown in FIG. 2B, mapping 240 may indicate that VM 208 having the object identifier "aa-11-bc" in the context of cloud computing system 250 is associated with the corresponding VM 208 which had the object identifier "aa-11-bb" in the context of private data center 202.

In another embodiment, hybrid cloud manager 132 updates mapping 240 to holistically track virtual objects or entities that have a presence on both private data center 202 and in public cloud computing system 250. Hybrid cloud manager 132 maps such virtual objects to their component parts, i.e., a set of virtual objects in the private data center and another set in the public cloud. In one example, mapping 240 is updated to track an application (application instance 206) as having a database tier (VM 210) and application tier (VM 212) within private data center 202, and having a scaled-out web tier (VMs 208, 252, 254, 256) within public cloud computing system 250. In another example, mapping 240 is updated to track a network 260 that stretches a first virtual network 214 within private data center 202 to a second virtual network 258 within public cloud computing system 250.

In one or more embodiments, hybrid cloud manager 132 and hybridity director 174 are configured to exchange messaging that coordinates a consistent mapping within the hybrid cloud computing system. In some embodiments, hybrid cloud manager 132 and hybridity director 174 may use a heartbeat mechanism to track the continued existence of related virtual objects as workloads evolve on both the cloud side and the private data center side for a given application, network, and/or workload. The heartbeat mechanism enables tracking of stretched virtual objects that span both private data center and public cloud computing system 250. For example, a policy object that is present on both sides should have the same identifier and maintained consistently from an identity perspective. A packaged application that stretches across the hybrid cloud computing system should be maintained in a similar manner.

Figure 3:
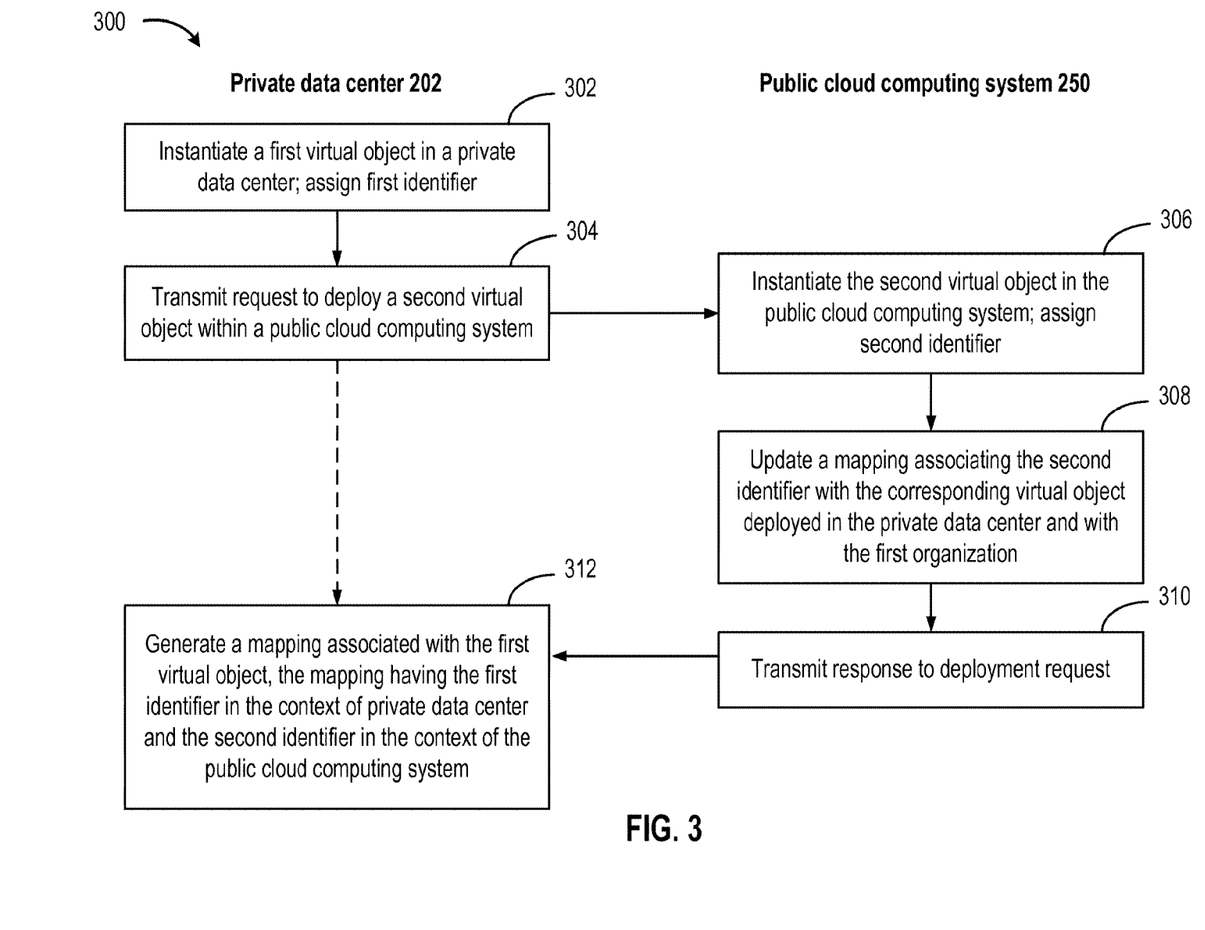
FIG. 3 is a flow diagram depicting a method for managing a hybrid cloud computing system, according to one embodiment of the present disclosure.

FIG. 3 is a flow diagram depicting a method 300 for managing a hybrid cloud computing system, according to one embodiment of the present disclosure. While method 300 is described in conjunction with components of the system shown in FIGS. 1, 2A, and 2B, other components in computer systems 100 and 200 may perform the steps of method 300, as well as other systems may perform the described method.

Method 300 begins at step 302, hybrid cloud manager 132 instantiates a first virtual object in private data center 202 managed by a first organization (i.e., an enterprise). In one embodiment, hybrid cloud manager 132 assigns a first identifier to the first virtual object, the first identifier being unique within private data center 202.

At step 304, hybrid cloud manager 132 transmits a request to deploy a second component of the virtual object in public cloud computing system 250. Hybrid cloud manager 132 may request the second component of the virtual object be deployed in a virtual data center allocated to the first organization as a tenant within public cloud computing system 250.

In one case, the deployment request may include an indication that the second virtual object is a migrated virtual machine corresponding to the first virtual object (as specified by the first object identifier). In other cases, the deployment request may include an indication that the first virtual object and the second virtual object are component parts of a (third) virtual object spanning the public cloud computing system and the private data center. For example, the third virtual object may be a packaged virtual machine application (e.g., application instance 206) having a first plurality of VMs (e.g., VMs 210, 212) deployed in private data center 202 and a second plurality of VMs (e.g., VMs 208, 252, 254, 256) to be deployed in a virtual data center in public cloud computing system 250. In another example, the third virtual object may be a virtual network comprised of a first virtual network (e.g., network 214) stretching from private data center 202 to a second virtual network (e.g., network 258) in public cloud computing system 250.

A deployment request for a virtual machine being migrated (e.g., VM 208) may include a set of files, which can include configuration file(s), virtual disk file(s), virtual disk delta file(s) and configuration file(s) associated with VM snapshot(s), basic input output system (BIOS) file(s), log file(s), and the like, packaged for distribution according a format, such as the standardized Open Virtualization Format (OVF). In one implementation, metadata in the virtual machine may be modified to specify the first identifier associated with the first virtual object having a context of private data center 202. As such, the deployment request may include metadata containing the first identifier associated with the first virtual object.

At step 306, responsive to receiving a deployment request from hybrid cloud manager 132, hybridity director 174 instantiates the second virtual object in public cloud computing system 250. In one embodiment, hybridity director 174 assigns to the second virtual object a (second) identifier, which is unique within cloud computing system 250.

At step 308, hybridity director 174 updates a mapping 242 associating the second identifier (of the second virtual object) with a corresponding virtual object deployed in private data center 202 and with the first organization.

At step 310, hybridity director 174 transmits a response to hybrid cloud manager 132 indicating the result of the deployment request. The response may indicate a status (e.g., success, error) of the deployment request. In some embodiments, the response may include the second identifier assigned by the public cloud computing system. In embodiments where the deployment request was a transfer of an existing VM, hybrid cloud manager 132 may de-instantiate the first virtual object in the private data center, responsive to a successful deployment of the second virtual object in the public cloud computing system.

At step 312, hybrid cloud manager 132 generates a mapping 240 associated with the first virtual object. Mapping 240 may include the first identifier having a context of private data center 202 and the second identifier having a context of public cloud computing system 250. In some implementations, the second identifier from public cloud computing system 250 may be received via the returned results in step 310, or alternatively, provided by a heartbeat message periodically received from hybridity director 174. In some embodiments, the mapping associates the first identifier within the context of the first organization and private data center 202, and also associates the second identifier within the context of the first organization as a tenant in public cloud computing system 250.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for managing an application executing in a computing system that includes a first cloud and a second cloud, wherein the first cloud is a private cloud operated by a first organization and the second cloud is a multi-tenant public cloud of which the first organization is one of a plurality of tenants, the method comprising:
   instantiating a first virtual object in the private cloud of the first organization for executing the application, wherein the first virtual object is assigned a first identifier unique within the private cloud;
   instantiating a second virtual object in the public cloud for executing the application cooperatively with the first virtual object, wherein the second virtual object is assigned a second identifier unique within the public cloud;
   generating a mapping associated with the first virtual object, wherein the mapping comprises the first identifier having a context of the private cloud and the second identifier having a context of the public cloud computing system;
   detecting migration of the first or second virtual object such that both of the first and second virtual objects are instantiated in a single one of the private and public clouds; and
   updating the mapping associated with the first virtual object to reflect the migration,
   wherein instantiating the first and second virtual objects defines different tiers of the application, which is a multi-tiered application.

2. The method of claim 1, wherein the first virtual object and the second virtual object are components of a third virtual object spanning the public cloud computing system and the private data center.

3. The method of claim 2, wherein the third virtual object comprises a packaged virtual machine application comprising a first plurality of virtual machines deployed in the private data center and a second plurality of virtual machines deployed in the public cloud computing system.

4. The method of claim 2, wherein the third virtual object comprises a virtual network stretching from the private data center to the public cloud computing system.

5. A non-transitory computer-readable storage medium containing program instructions for managing a hybrid cloud computing system, wherein execution of the program instructions by one or more processors of a computer system causes the one or more processors to perform steps comprising:
   instantiating, a first virtual object in the private cloud of the first organization for executing the application, wherein the first virtual object is assigned a first identifier unique within the private cloud;
   instantiating a second virtual object in the public cloud for executing the application cooperatively with the first virtual object, wherein the second virtual object is assigned a second identifier unique within the public cloud;
   generating a mapping associated with the first virtual object, wherein the mapping comprises the first identifier having a context of the private cloud and the second identifier having a context of the public cloud computing system;
   detecting migration of the first or second virtual object such that both of the first and second virtual objects are instantiated in a single one of the private and public clouds; and
   updating the mapping associated with the first virtual object to reflect the migration,
   wherein instantiating the first and second virtual objects defines different tiers of the application, which is a multi-tiered application.

6. The non-transitory computer-readable storage medium of claim 5, wherein the first virtual object and the second virtual object are components of a third virtual object spanning the public cloud computing system and the private data center.

7. The non-transitory computer-readable storage medium of claim 6, wherein the third virtual object comprises a packaged virtual machine application comprising a first plurality of virtual machines deployed in the private data center and a second plurality of virtual machines deployed in the public cloud computing system.

8. The non-transitory computer-readable storage medium of claim 6, wherein the third virtual object comprises a virtual network stretching from the private data center to the public cloud computing system.

9. A hybrid cloud computing system, comprising:
- a private data center managed by a first organization;
- a public cloud computing system managed by a second organization, wherein the first organization is a tenant in the public cloud computing system;
- wherein the private data center is configured to:
  - instantiate a first virtual object in the private cloud of the first organization for executing the application, wherein the first virtual object is assigned a first identifier unique within the private cloud;
  - instantiate a second virtual object in the public cloud for executing the application cooperatively with the first virtual object, wherein the second virtual object is assigned a second identifier unique within the public cloud;
  - generate a mapping associated with the first virtual object, wherein the mapping comprises the first identifier having a context of the private cloud and the second identifier having a context of the public cloud computing system;
  - detect migration of the first or second virtual object such that both of the first and second virtual objects are instantiated in a single one of the private and public clouds; and
  - update the mapping associated with the first virtual object to reflect the migration,
- wherein instantiation of the first and second virtual objects defines different tiers of the application, which is a multi-tiered application.

10. The hybrid cloud computing system of claim 9, wherein the first virtual object and the second virtual object are components of a third virtual object spanning the public cloud computing system and the private data center.

11. The hybrid cloud computing system of claim 10, wherein the third virtual object comprises a packaged virtual machine application comprising a first plurality of virtual machines deployed in the private data center and a second plurality of virtual machines deployed in the public cloud computing system.

12. The hybrid cloud computing system of claim 10, wherein the third virtual object comprises a virtual network stretching from the private data center to the public cloud computing system.

* * * * *